US008760188B2

United States Patent
Gondi et al.

(10) Patent No.: US 8,760,188 B2
(45) Date of Patent: Jun. 24, 2014

(54) CONFIGURABLE MULTI-DIMENSIONAL DRIVER AND RECEIVER

(75) Inventors: Srikanth Gondi, Sunnyvale, CA (US); Roger Isaac, San Jose, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 0 days.

(21) Appl. No.: 13/174,616

(22) Filed: Jun. 30, 2011

(65) Prior Publication Data

US 2013/0002290 A1 Jan. 3, 2013

(51) Int. Cl.
*H03K 17/16* (2006.01)

(52) U.S. Cl.
USPC .................................................... 326/30

(58) Field of Classification Search
USPC .............................. 326/26, 27, 30
See application file for complete search history.

(56) References Cited

U.S. PATENT DOCUMENTS

| | | | |
|---|---|---|---|
| 5,982,210 A | 11/1999 | Rogers | |
| 6,718,473 B1 | 4/2004 | Mirov et al. | |
| 6,748,469 B1 | 6/2004 | Caldwell et al. | |
| 6,845,420 B2 | 1/2005 | Resnick | |
| 6,870,419 B1 | 3/2005 | Garrett et al. | |
| 6,996,749 B1 | 2/2006 | Bains et al. | |
| 7,036,032 B2 | 4/2006 | Mizuyabu et al. | |
| 7,089,444 B1 | 8/2006 | Asaduzzaman et al. | |
| 7,155,617 B2 | 12/2006 | Gary et al. | |
| 7,496,774 B2 | 2/2009 | Lu | |
| 7,505,512 B1 * | 3/2009 | Anderson et al. | 375/229 |
| 2002/0061016 A1 | 5/2002 | Mullaney et al. | |
| 2003/0074515 A1 | 4/2003 | Resnick | |
| 2003/0105896 A1 | 6/2003 | Gredone et al. | |
| 2004/0098545 A1 | 5/2004 | Pline et al. | |
| 2005/0030200 A1 | 2/2005 | Holt | |
| 2005/0174153 A1 | 8/2005 | Saeki | |
| 2005/0242851 A1 | 11/2005 | Booth et al. | |
| 2006/0192622 A1 | 8/2006 | Narita | |
| 2007/0035336 A1 | 2/2007 | Lee | |
| 2007/0080718 A1 * | 4/2007 | Stojanovic et al. | 326/87 |
| 2007/0230513 A1 | 10/2007 | Talbot et al. | |

(Continued)

FOREIGN PATENT DOCUMENTS

EP 0834814 4/1998

OTHER PUBLICATIONS

Non-Final Office Action for U.S. Appl. No. 11/690,659 mailed Feb. 23, 2010.

(Continued)

*Primary Examiner* — Thienvu Tran
(74) *Attorney, Agent, or Firm* — Fenwick & West LLP

(57) ABSTRACT

Embodiments of the invention are generally directed to a configurable multi-mode driver and receiver. An embodiment of a communication system includes a communication channel, and a first device and a second device coupled with the communication channel. The first device includes a driver apparatus to drive data signals on the communication channel, the driver apparatus including circuits to receive and drive the data signals, where the circuits are configurable for termination resistance of the driver circuit apparatus, and each of the plurality of circuits is comprised of one or more circuit units, the circuit units being configurable for equalization control of the driver apparatus. The second device includes a receiver to receive data signals from the communication channel as an input. Either the first device or the second device includes configurable circuit elements to provide signal reflection control for the system.

29 Claims, 12 Drawing Sheets

(56) References Cited

U.S. PATENT DOCUMENTS

| | | | |
|---|---|---|---|
| 2007/0281741 | A1 | 12/2007 | Lu et al. |
| 2008/0164905 | A1* | 7/2008 | Hamanaka ............. 326/30 |
| 2008/0310491 | A1 | 12/2008 | Abbasfar et al. |
| 2009/0182912 | A1 | 7/2009 | Yoo et al. |
| 2009/0256585 | A1 | 10/2009 | Kwon et al. |
| 2009/0289668 | A1 | 11/2009 | Baldisserotto et al. |
| 2009/0327565 | A1 | 12/2009 | Ware |
| 2010/0060316 | A1* | 3/2010 | Kim et al. ............. 326/30 |
| 2010/0097094 | A1 | 4/2010 | Jang |
| 2010/0103994 | A1 | 4/2010 | Frans et al. |
| 2010/0127751 | A1 | 5/2010 | Lin |
| 2010/0157644 | A1 | 6/2010 | Norman |
| 2010/0164539 | A1 | 7/2010 | Balamurugan et al. |
| 2010/0296566 | A1 | 11/2010 | Beyene et al. |
| 2011/0050280 | A1 | 3/2011 | Maddux et al. |
| 2011/0196997 | A1 | 8/2011 | Ruberg et al. |
| 2011/0222594 | A1 | 9/2011 | Zerbe et al. |

OTHER PUBLICATIONS

Notice of Allowance for U.S. Appl. No. 11/690,659 mailed Aug. 25, 2010.

International Search Report and Written Opinion for International Patent Application No. PCT/US2011/023697, Mailed Oct. 25, 2011, 11 pages.

Final Office Action for U.S. Appl. No. 12/704,417, Mailed Feb. 14, 2012, 18 pages.

Kevin Ross, The Basics-Very Basic Circuits, Mar. 1997, www.seattlerobotics.org.

B. Leibowitz, et al., "A 4.3GB/s Mobile Memory Interface With Power-Efficient Bandwidth Scaling," IEEE J. Solid-State Circuits, Apr. 2010.

H. Partovi, et al., "Single-ended Transceiver Design Techniques for 5.33Gb/s Graphics Applications," IEEE International Solid-State Circuits Conference, Feb. 2009.

International Search Report and Written Opinion of the International Searching Authority in International Patent Application No. PCT/US2012/043767, 15 pages.

International Search Report and Written Opinion of the International Searching Authority in International Patent Application No. PCT/US2012/043770, 9 pages.

K-L J. Wong, et al., "A 27mW 3.6-Gb/s I/O Transceiver," IEEE J. Solid-State Circuits, Apr. 2004.

Office Action dated Jan. 15, 2013, in U.S. Appl. No. 13/174,630, 12 pages.

Office Action mailed Aug. 31, 2011, in U.S. Appl. No. 12/704,417, 12 pages.

Seung-Jun Bae, et al., "An 80nm 4Gb/s/pin 32 bit 512Mb GDDR4 Graphics DRAM with Low Power and Low Noise Data Bus Inversion," IEEE J. Solid-State Circuits, Jan. 2008.

W. D. Dettloff, et al., "A 32mW 7.4Gb/s Protocol-Agile Source-Series Terminated Transmitter in 45nm CMOS SOI," IEEE International Solid-State Circuits Conference, Feb. 2010.

International Preliminary Report on Patentability for International Patent Application No. PCT/US2008/057926 mailed Oct. 8, 2009.

Office Action mailed Aug. 2, 2013, in U.S. Appl. No. 13/934,147, 6 pages.

B. Razavi, "Prospects of CMOS Technology for High-Speed Optical Communication Circuits," IEEE J. Solid-State Circuits, Sep. 2002.

G. Balamurugan et al., "Modeling and Analysis of High-Speed I/O Links," IEEE Transactions on Advanced Packaging, May 2009.

H. Lee et al., "A 16 Gb/s/Link, 64 GB/s Bidirectional Asymmetric Memory Interface," IEEE J. Solid-State Circuits, Apr. 2009.

International Search Report and Written Opinion of the International Searching Authority dated Nov. 25, 2013, in International Patent Application No. PCT/US2013/052126, 13 pages.

Office Action mailed Nov. 6, 2013, in U.S. Appl. No. 13/174,630, 13 pages.

S. Palermo et al., "A 90 nm CMOS 16 Gb/s Transceiver for Optical Interconnects," IEEE J. Solid-State Circuits, May 2008.

* cited by examiner

CONFIGURABLE MULTI-DIMENSIONAL DRIVER AND RECEIVER

TECHNICAL FIELD

Embodiments of the invention generally relate to the field of electronic devices and, more particularly, to a configurable multi-dimensional driver and receiver.

BACKGROUND

Data throughputs are increasing in chip-to-chip interconnects in applications ranging from backplanes in server systems to SOCs (systems on chip) interfaced to memories in mobile devices. This trend has been pushed forward by the increasing capacity of digital computation resulting from improvements in semiconductor technology.

Although on-chip speeds may scale upward for particular technologies, the corresponding electrical interface speeds may be restricted by issues that are unrelated to the semiconductor technology.

For example, I/O drivers are a significant component in interface design, and may present a significant bottleneck in improving overall performance in terms of speed and power. Among the issues that need to be addressed are the limitations presented by circuits that either include a termination resistance, thereby creating a significant current load, or do not include a termination resistance, and thereby create a limitation in speed for the I/O interface.

BRIEF DESCRIPTION OF THE DRAWINGS

Embodiments of the invention are illustrated by way of example, and not by way of limitation, in the figures of the accompanying drawings in which like reference numerals refer to similar elements.

SUMMARY

Figure 1:
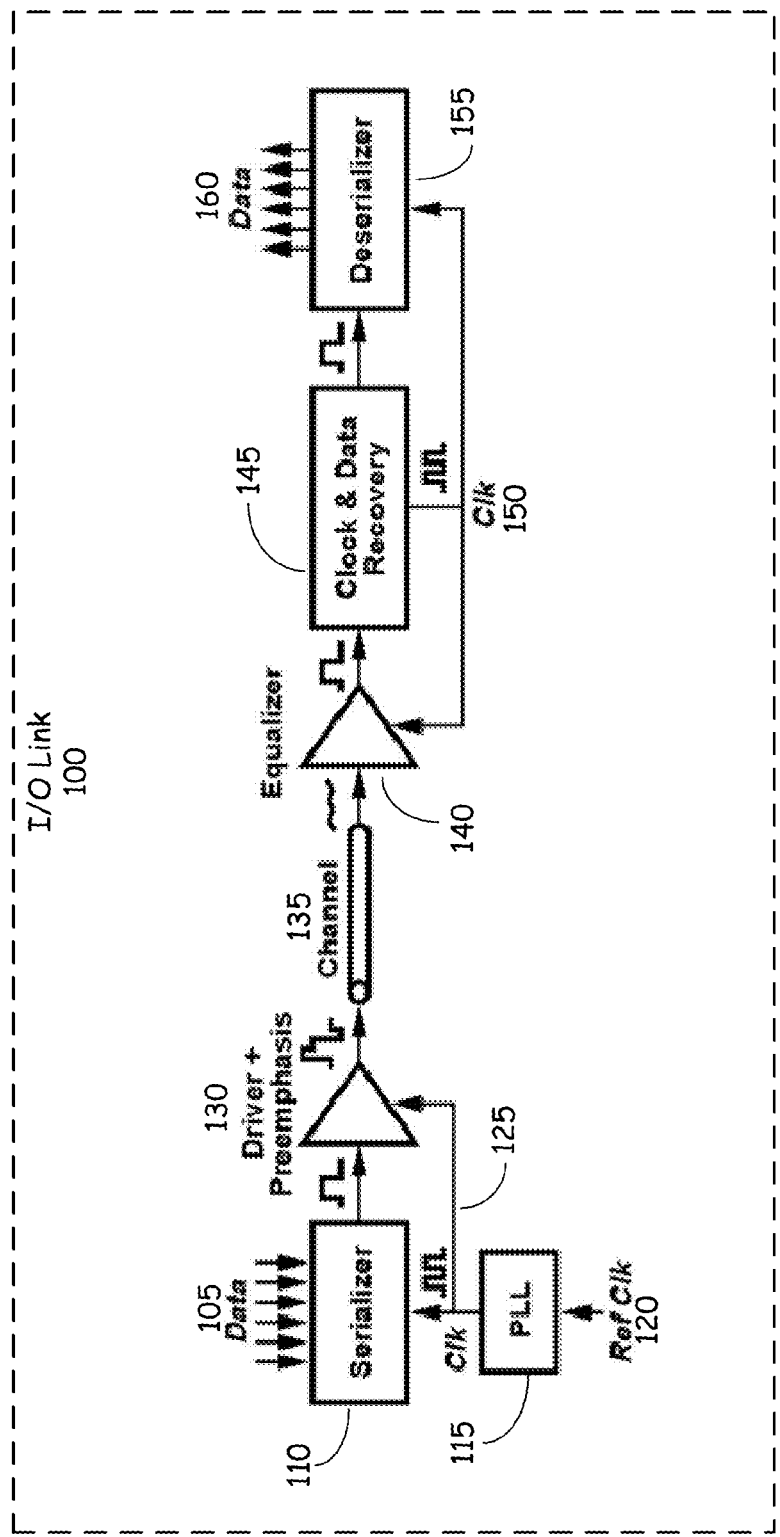
FIG. 1 illustrates an embodiment of elements of an I/O link.

Embodiments of the invention are generally directed to a configurable multi-dimensional driver and receiver.

In a first aspect of the invention, an embodiment of an apparatus includes a predriver to provide data signals, and circuits to receive and drive the data signals from the pre-driver, where circuits are configurable for termination resistance of the driver circuit apparatus, each of circuits is including one or more circuit units, the circuit units being configurable for equalization control of the driver apparatus, and each of the circuit units including multiple circuit sub-units, the circuit sub-units being configurable for signal reflection control for the driver apparatus. The apparatus further includes an interface with a communication channel, where the circuits are coupled with the communication channel.

In a second aspect of the invention, an embodiment of a communication system includes a communication channel, and a first device coupled with the communication channel. The first device includes a driver apparatus to drive data signals on the communication channel, the driver apparatus including multiple circuits to receive and drive the data signals, where circuits are configurable for termination resistance of the driver circuit apparatus, each of the circuits includes one or more circuit units, the circuit units being configurable for equalization control of the driver apparatus. The system further includes a second device coupled with the communication channel, the second device including a receiver to receive data signals from the communication channel. Either the first device or the second device includes configurable circuit elements to provide signal reflection control for the system.

In a third aspect of the invention, a system for signal communication includes a first device, the first device including a multi-dimensional driver apparatus having multiple circuits. The driver apparatus includes configurable termination resistance, wherein the configuration of the termination resistance is provided by enablement of one or more of the circuits; configurable signal emphasis, where the configuration of the signal emphasis is provided by signal samples provided to each of one or more circuit units for each of the circuits; and configurable reflection cancellation, where the configuration of the reflection cancellation is provided by delayed clocks for the clocking of the signal samples provided to each of multiple circuit sub-units for each of the circuit units. The system further includes a second device coupled with the first device via a communication channel, the second device including a receiver apparatus to receive data signals from the communication channel.

In a fourth aspect of the invention, a method for configuring a communication interface includes determining parameters for an interface between a first device and a second device, the first device including a configurable driver apparatus and the second device including a receiving apparatus. The method further includes configuring a termination resistance of the driver apparatus of the first device by enabling one or more of multiple circuits; configuring signal equalization of the driver apparatus by providing certain signal samples to one or more circuit units of each of the circuits; and configuring signal reflection cancellation of the driver apparatus by providing certain timing delays for inputs of the signal samples to multiple circuit sub-units of each of the circuit units of each of the circuits.

DETAILED DESCRIPTION

Embodiments of the invention are generally directed to a configurable multi-dimensional configurable driver and receiver.

In some embodiments, a method, apparatus, or system provides for a multi-dimensional driver that is configurable to control emphasis and reflection. In some embodiments, a method, apparatus, or system may further includes a receiver for a multi-dimensional driver. As used herein, "multi-dimensional" refers to a driver in which circuit slices are configured in the form of multiple units, wherein each division of circuit slices may be referred to as a "dimension".

In some embodiments, an apparatus, system, or method includes a driver front-end design for high-speed wire-line interfaces, including, for example, dynamic random access memory (DRAM) interfaces. In some embodiments, a multi-dimensional technique to incorporate reflection cancellation, equalization, and termination control in drivers is presented. In some embodiments, a receiver to receive data from a multi-dimensional driver provides for reflection cancellation.

In some embodiments, a driver apparatus includes a plurality of circuits, each circuit including one or more circuit units, and each circuit unit including a plurality of circuit sub-units. In some embodiments, each circuit sub-unit includes a first resistor and a second resistor, wherein a first end of the first resistor and a first end of the second resistor are coupled at a node, where the node may coupled with a communication node. In some embodiments, a second end of the first resistor is coupled with a first terminal of a first transistor, a second terminal of the first transistor being coupled with a voltage source. In some embodiments, a second end of the second resistor is coupled with a first terminal of a second transistor, with a second terminal of the first transistor being coupled with ground potential. In some embodiments, an input is provided to a gate of the first transistor and a gate of the second transistor, where the input may be a sample of an input signal to the driver apparatus, where the sample may be delayed by a certain delay factor.

In some embodiments, a driver apparatus includes configurable termination resistance, wherein the configuration of the termination resistance is provided by enablement of one or more of a plurality of circuits; configurable signal emphasis, where the configuration of the emphasis is provided by enablement of one or more circuit units for each of the circuits; and configurable reflection cancellation, where the configuration of the reflection cancellation is provided by enablement of one or more of a plurality of circuit sub-units for each of the circuit units or by configuration of a receiver apparatus.

FIG. 1 illustrates an embodiment of elements of an I/O link. In this illustration, functional blocks of a single-channel I/O link electrically connecting two devices are provided. As shown, parallel data 105 is serialized by a serializer 110, with the serialized output being received by a driver 130 for transmission via a channel 135. The serializer 110 and driver 130 may be clocked by a clock signal 125 produced by a phase lock loop (PLL) circuit 115, which creates the clock signal 125 using a reference clock signal 120. The serialized data transmitted via the channel 135 is received by a signal equalizer 140, which provides equalized data signals to a clock and data recovery element 145. The clock and data recovery element provides recovered data to a deserializer 155 and a recovered clock signal 150 to the signal equalizer 140 and deserializer 155. The deserializer 155 deserializes the data and produces a parallel data output 160.

In operation, a significant portion of the overall power consumption of the I/O link 100 is dissipated by the driver 130. In some embodiments, the driver 130 is a configurable multi-mode driver that may be configured to reduce power consumption. In some embodiments, driver 130 is a multidimensional driver providing termination control, equalization/de-emphasis control, and reflection control.

Figure 2:
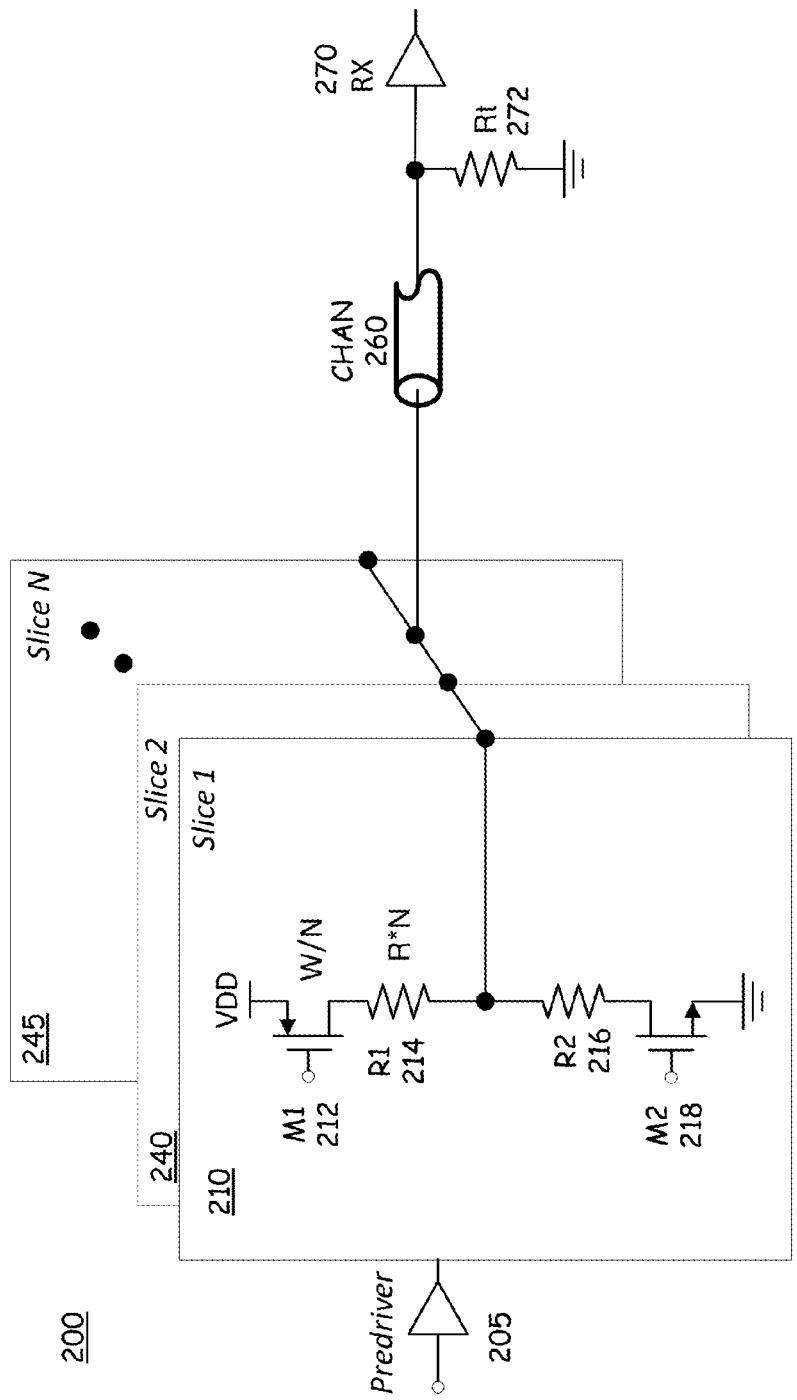
FIG. 2 illustrates a source-series terminated driver.

FIG. 2 illustrates a source-series terminated driver. In this illustration, the source-series terminated driver 200 (also referred to as voltage-mode driver) provides termination control. The driver includes multiple circuit "slices", each slice being a circuit, shown as Slice 1 (210), Slice 2 (240), and continuing through Slice N (245). As shown in FIG. 2, a predriver 205 provides signals to the slices. In this illustration, each circuit slice includes a first transistor (M1) 212 with a first terminal coupled with supply voltage VDD and a second terminal coupled with a first end of a first resistor (R1) 214. A second end of R1 214 is coupled with a first end of a second resistor (R2) 216 and to a communication channel (CHAN) 260. A second end of R2 216 is coupled with a first terminal of second transistor (M2) 218, where a second terminal of M2 218 is coupled with ground. An input data signal from the predriver 205 is received at the gates of M1 and M2.

As illustrated, the values of the elements for the driver 200 relate to the number of circuit slices. Thus, if there are N slices with the transistor gate width for the driver being equivalent to W and the resistance of the resistors being equivalent to R, then M1 212 has a gate width of W/N and resistor R1 214 has a resistance of R*N ohms. Depending on the driver termination requirements, the driver may be configured such that a certain number of slices are engaged, with the other slices being tri-stated.

As illustrated in FIG. 2, a receiver (RX) 270 is coupled with CHAN 260, where the connection includes a resistor termination (Rt) 272 to ground. In the illustrated structure, the driver 200 consumes static current in a high state, and thus there is a significant power penalty associated with the resistor termination 272.

Figure 3:
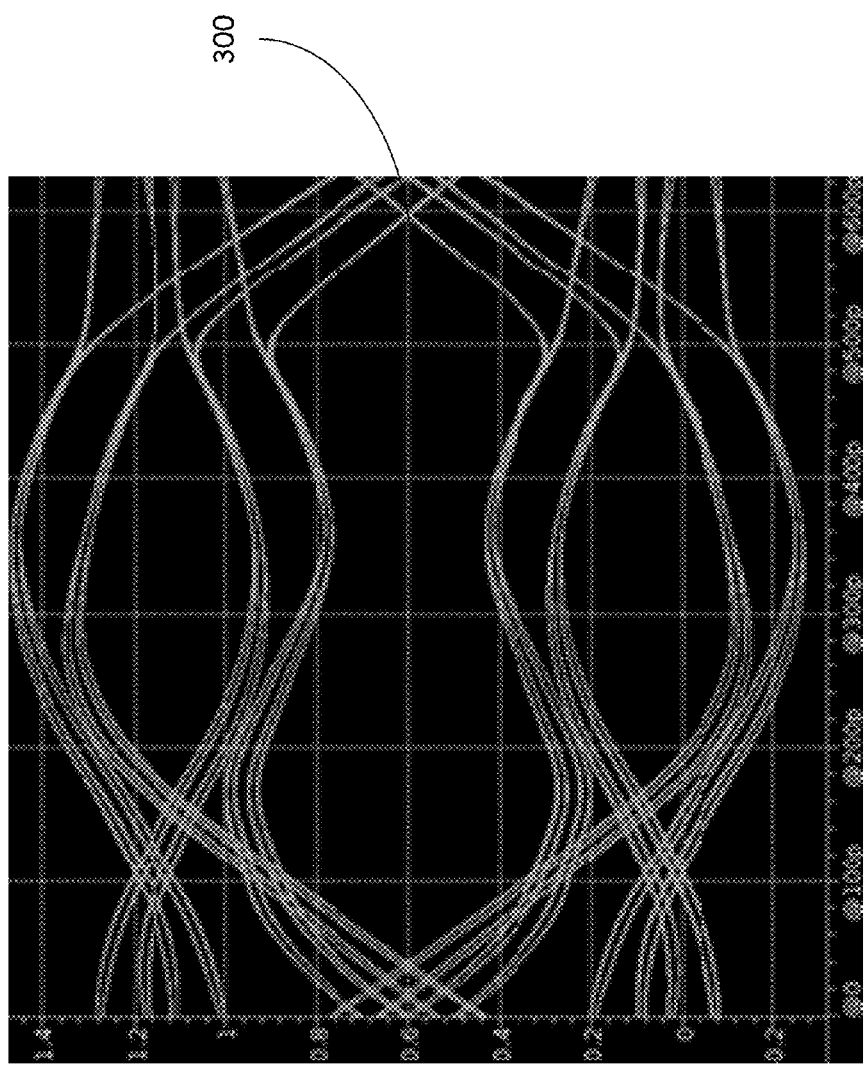
FIG. 3 is a waveform produced by a circuit without a termination resistor.
Figure 4:
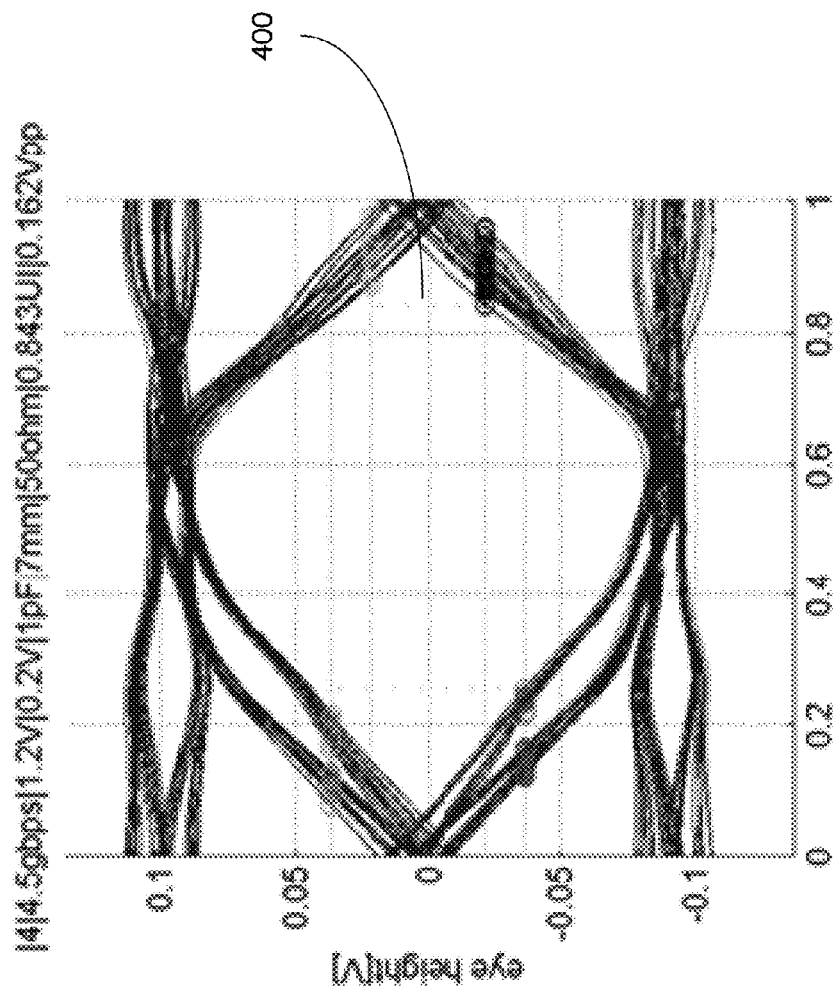
FIG. 4 is a waveform produced by a circuit with a termination resistor.

In the operation of a driver, the existence or non-existence of a termination resistor, such as resistor termination 272 in FIG. 2, has a great effect on the operation of the driver circuit. To illustrate the operation of a circuit, FIG. 3 is a waveform produced by a circuit without a termination resistor, and FIG. 4 is a waveform produced by a circuit with a termination resistor. FIGS. 3 and 4 demonstrate the eye diagram (or eye pattern) generated with overlapping data patterns that are time shifted. In comparing the waveforms with and without termination, it can be seen in FIG. 3 that the eye in the eye pattern 300 starts to close at approximately 1.6 Gbps (gigabits per second) in the circuit without termination, while in FIG. 4 the eye pattern 400 remains open at approximately 4.5 Gbps with termination resistor. Thus, the termination plays a significant role in maintaining signal integrity, which is illustrated in terms of the eye opening. This is due to the effect of reflections from a receiver that return to the driver and corrupt the existing signal, creating dips or peaks in the eye. In addition, there is the additional effect of supply bounce (where a rapid change in current, such as caused by the switching of elements in a circuit, causes the supply voltage to osculate above and/or below normal levels), but in FIGS. 3 and 4 the effects of supply bounce are well controlled.

The corruption of data resulting from signal reflection may severely limit maximum speeds achievable for a system. However, a benefit of a non-terminated circuit is that the power dissipation is low in comparison to a terminated circuit, with the power consumption being limited to dynamic power consumption of the circuit.

In some embodiments, a driver apparatus operates to increase the width and height of the eye of the output graph. In some embodiments, a driver is operable to handle channels with minimal or no termination resistance, while the channel is also operable to transmit data at high-speeds. In some embodiments, a driver operates to increase the eye opening at the receiver input, thereby allowing for improved interface performance.

In some embodiments, a configurable multi-dimensional driver includes:

(1) Termination control;
(2) Equalization/de-emphasis control; and
(3) Reflection control.

Figure 5:
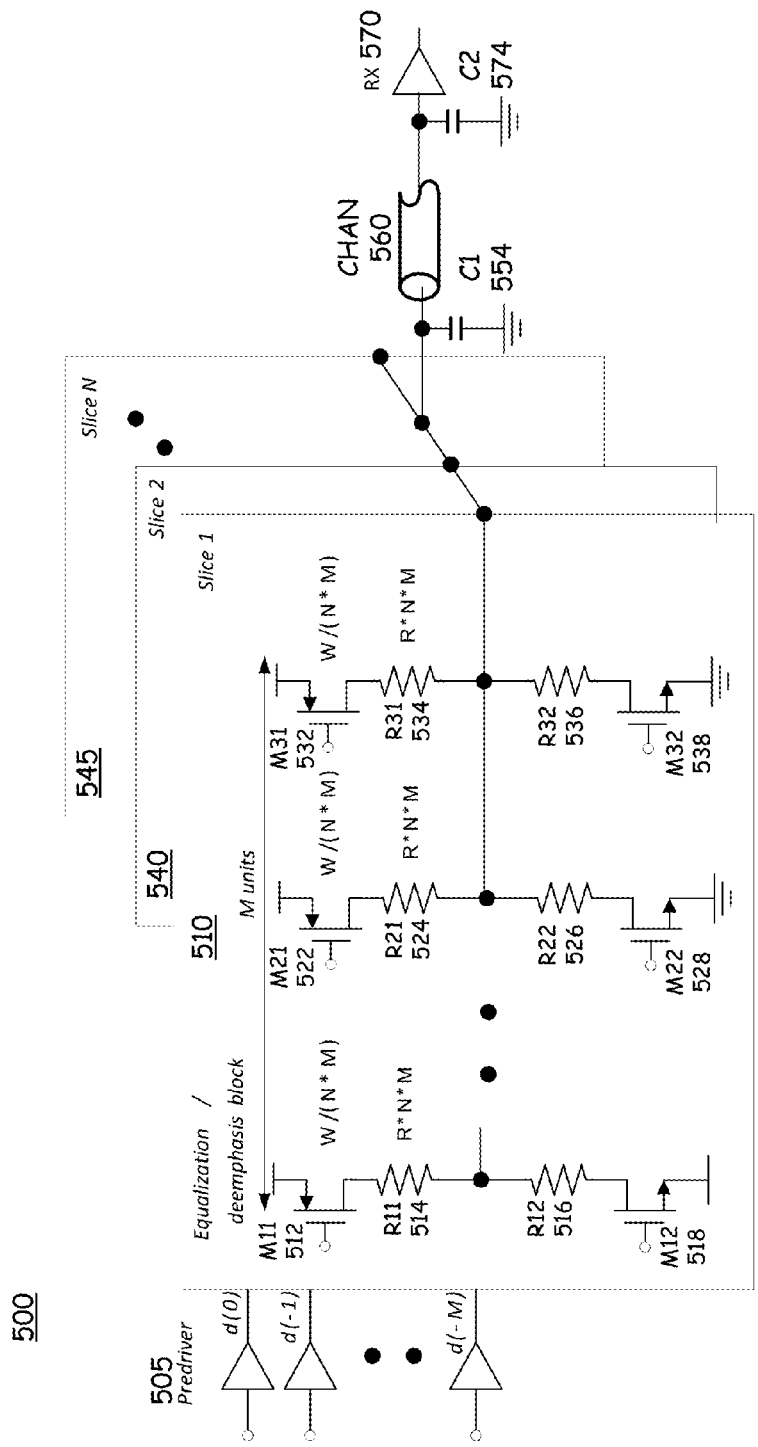
FIG. 5 illustrates an embodiment of a multi-dimensional driver.

FIG. 5 illustrates an embodiment of a multi-dimensional driver. In some embodiments, termination control utilizes the division of a driver circuit into multiple slices. In FIG. 5, the driver 500 includes N circuit slices illustrated as Slice 1 (510), Slice 2 (540), and continuing through Slice N (545). In some embodiments, each slice is further divided into a certain number (M, in this example) of circuit units to provide an equalization/de-emphasis block. In some embodiments, each unit of each slice includes a circuit structure. In this illustration, a first unit includes a first transistor (M11) 512 with a first terminal coupled with supply voltage VDD and a second terminal coupled with a first end of a first resistor (R11) 514. A second end of R11 514 is coupled with a first end of a second resistor (R12) 516 and to a communication channel (CHAN) 560. A second end of R12 516 is coupled with a first terminal of second transistor (M12) 518, where a second terminal of M12 518 is coupled with ground. An input data signal from the predriver 505 is received at the gates of M11 and M12. Further, each additional unit of slice 510 contains elements constructed in the same manner, such as an (M−1)th unit comprising a first transistor (M21) 522, a first resistor (R21) 524, a second resistor (R22) 526, and a second transistor (M22) 528, and continuing through an Mth unit comprising a first transistor (M31) 532, a first resistor (R31) 534, a second resistor (R32) 536, and a second transistor (M32) 538. The values of the elements reflect the existence of N slices containing M units, with a transistor gate width of W/(M*N) and a resistance of R*N*M ohms.

As illustrated, the two dimensions of circuit slices are coupled with a transmitter side of a channel (CHAN) 560, where a receiver (RX) 570 is coupled with a receiver side of CHAN 560, the channel being coupled with ground via a first capacitor (C1) 554 on the transmitter side and via second capacitor (C2) 574 on the receiver side.

As illustrated, the predriver 505 provides M samples, d(0), d(−1), and continuing through D(−M). In an example, if one tap equalization is needed, then the samples d(0) and d(−1) are split among the M units such that the required equalization is achieved. In a specific example, if 6 dB of equalization is needed with two taps, then the samples are equally split among M units. In some embodiments, the M units may be split with binary weighting instead of a linear weighting, as provided in FIG. 5.

Figure 6:
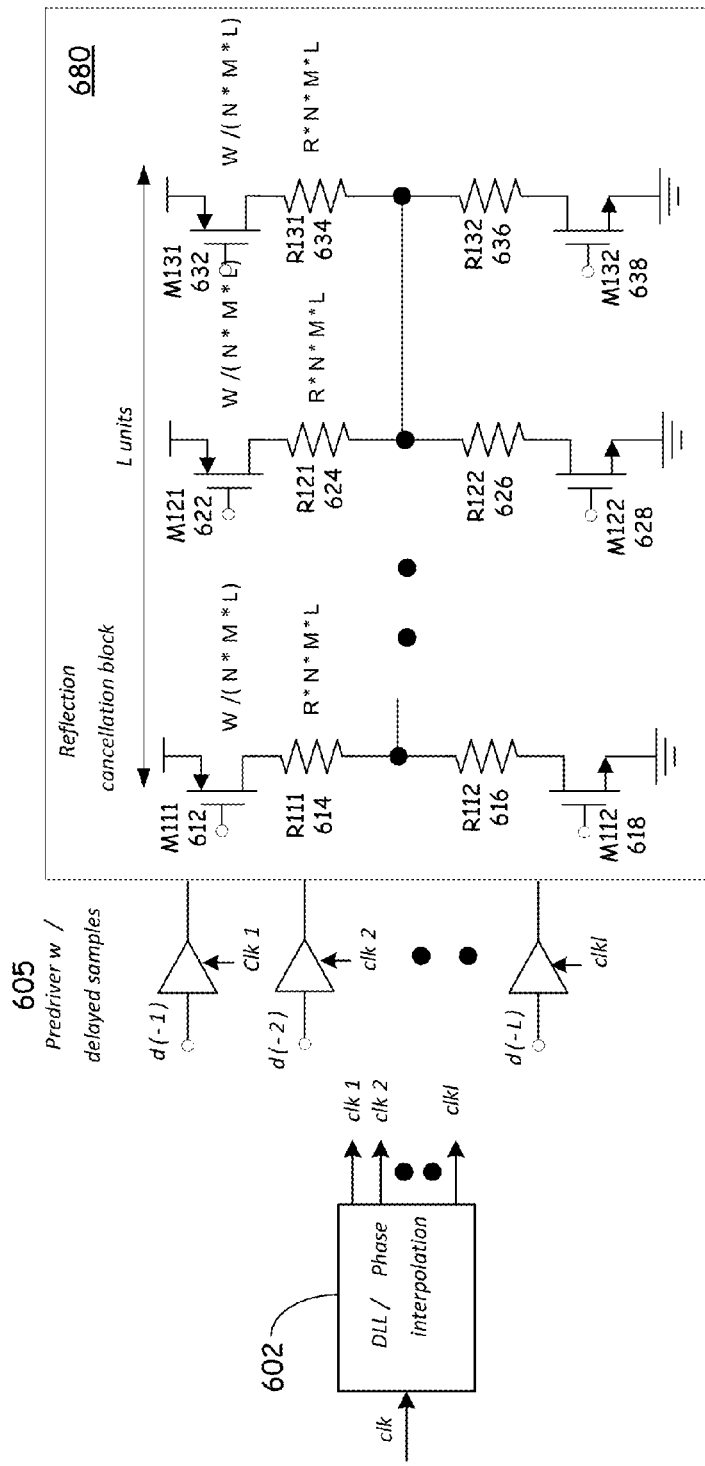
FIG. 6 illustrates an embodiment of a reflection cancellation block of a driver.

FIG. 6 illustrates an embodiment of a reflection cancellation block of a driver. In some embodiments, to provide reflection cancellation, each of the N units in a slice may be further divided into L units, as illustrated in reflection cancellation block 680 of FIG. 6. As used herein, the L units may be referred to as "sub-units". In this illustration, a first sub-unit of the L sub-units includes a first transistor (M111) 612 with a first terminal coupled with supply voltage VDD and a second terminal coupled with a first end of a first resistor (R111) 614. A second end of R111 614 is coupled with a first end of a second resistor (R112) 616 and to the communication channel. A second end of R112 616 is coupled with a first terminal of second transistor (M112) 618, where a second terminal of M112 618 is coupled with ground. An input data signal sample from one of a plurality of elements of a pre-driver 605 is received at the gates of M11 and M12. Further, each additional sub-unit of the reflection cancellation block 680 contains elements constructed in the same manner, such as an (L−1)th sub-unit comprising a first transistor (M121) 622, a first resistor (R121) 624, a second resistor (R122) 626, and a second transistor (M122) 628, and continuing through an Lth sub-unit comprising a first transistor (M131) 632, a first resistor (R131) 634, a second resistor (R132) 636, and a second transistor (M132) 638. The values of the elements reflect the existence of N slices containing M elements, each containing L sub-units, with a transistor gate width of W/(M*N*L) and a resistance of R*N*M*L ohms.

In some embodiments, the input to each of the L sub-units of a reflection cancellation block depends on worst-case samples that cause reflection. An additional parameter to be considered is time of flight ("tf"), which is the time required for a signal to be transmitted between the driver and receiver. Present and past samples are responsible for reflection degradation with a time shift that depends on the time of flight, where the time of flight depends on the characteristics of the particular communication channel, including the device package, board, bond wires, and other related elements of the communication channel.

In some embodiments, a time adjustment block, such as a DLL (delay locked loop)/phase interpolation unit 602, may be used to provide precise control of the timing necessary for canceling reflective components. As illustrated, phases $clk_1$, $clk_2$, and continuing to $clk_l$ from the DLL/phase interpolator unit 602 may be used to control the timing of the signals coming from the elements of the pre-driver 605. In some embodiments, the phase difference between each of these phases ($clk_1$, $clk_2$, . . . , $clk_l$) may be in the order of multiples of tf, the time of flight across the channel.

Figure 7:
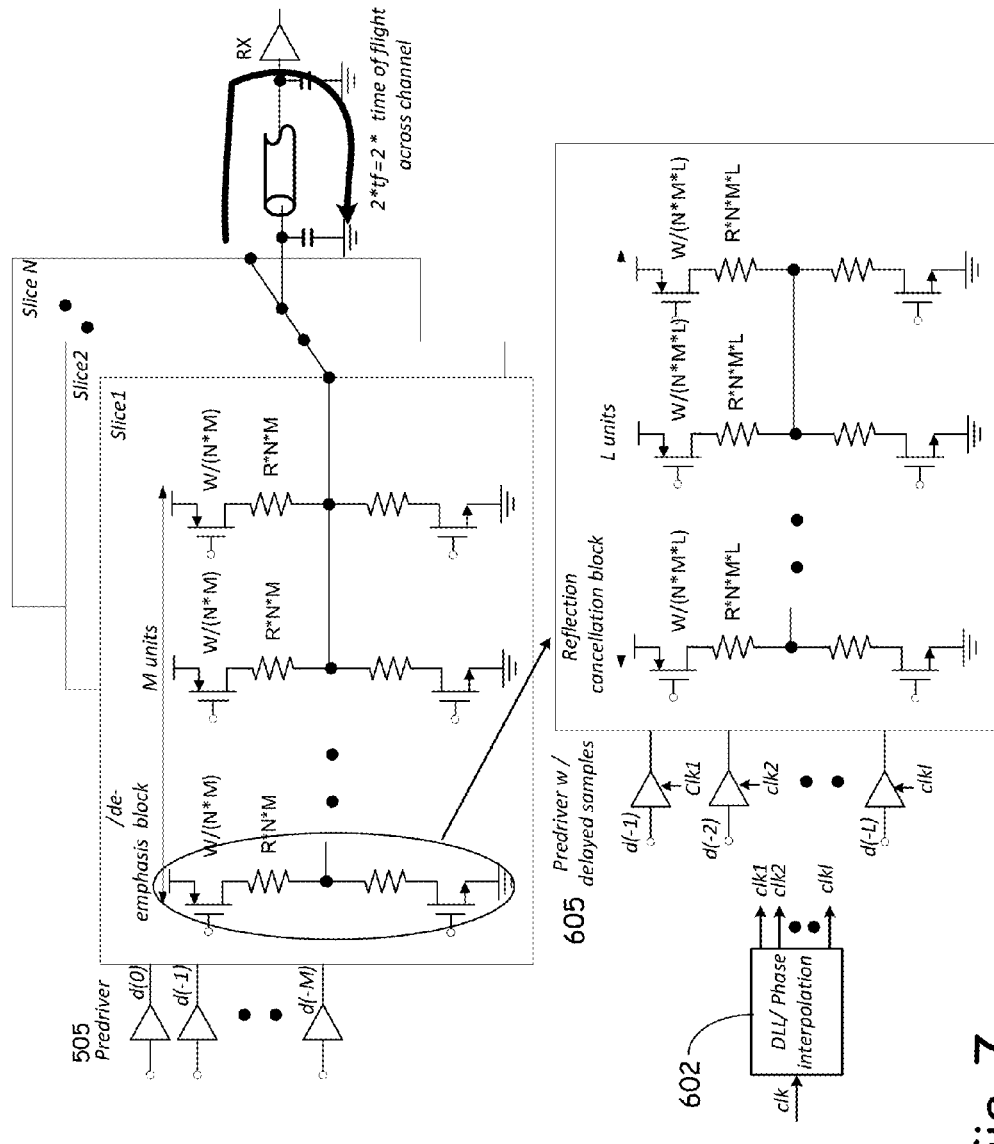
FIG. 7 is an illustration of an embodiment of a multi-dimensional driver including reflection cancellation blocks.

FIG. 7 is an illustration of an embodiment of a multidimensional driver including reflection cancellation blocks. In this illustration, a driver 700 includes N slice (510, 540, and 545), with each slice being further divided by the equalization/de-emphasis block 510 to include M units, as illustrated in FIG. 5. The units receive data from the predriver 505. Further, each of the units of a slice is further divided by the reflection cancellation block 680 as illustrated in FIG. 6, where the sub-units receive delayed samples of the data signals as provided by the predriver 605, where the clocking for the delayed samples is provided by the DLL/phase interpolation unit 602. In some embodiments, the driver 700 is configurable to provide control of termination, equalization, and reflection.

Figure 8:
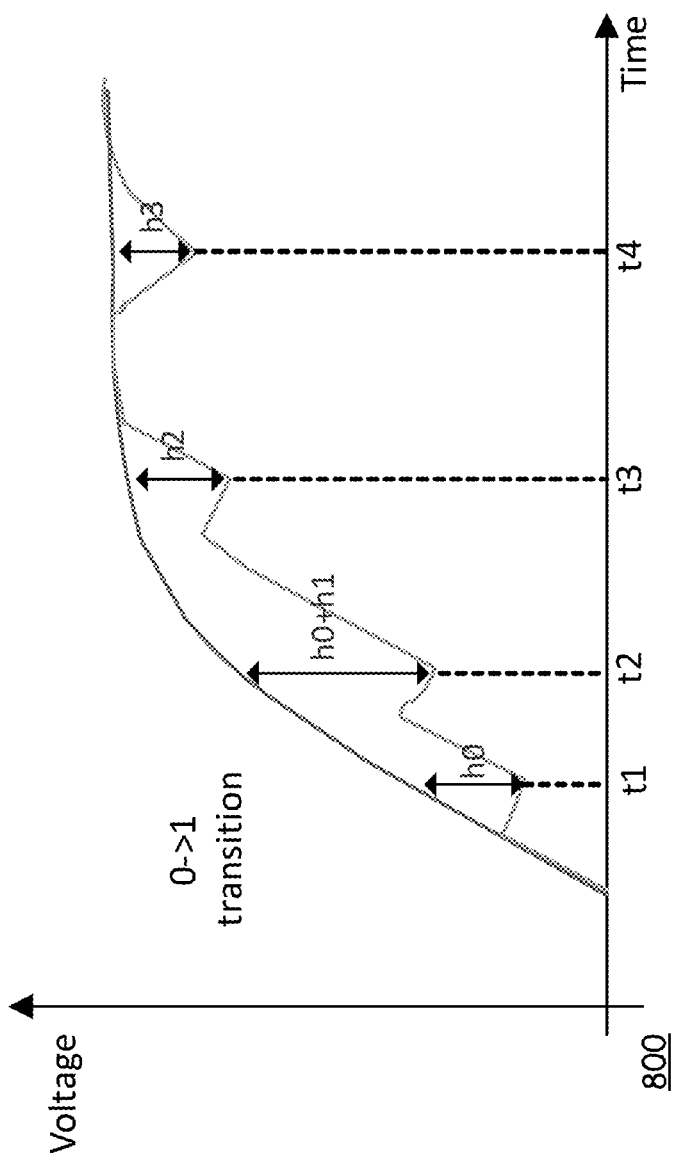
FIG. 8 illustrates a step response of a channel over time.

With regard to a method, apparatus, or system that provides reflection cancellation, FIG. 8 illustrates a step response of a channel over time. In this illustration, the graph 800 provides the step response at a receiver when the driver has a transition from '0' to '1' (thus, for example, a transition from zero volts representing a logical value of '0' to a voltage representing a value of '1'. (It is noted that observing the impulse response for a system produces similar results as illustrated in FIG. 8.) While the line is being charged to VDD voltage the reflections across the line create undue non-monotonic perturbations that compromise the overall signal integrity. Across a one-bit period several reflective components are possible, and hence a fractional bit-time period resolution may be required to cancel the finer perturbations. In this example, the perturbations occur at time periods t1, t2, t3, and t4 with values of h0, h0+h1, h2, and h3, respectively.

In some embodiments, the perturbations illustrated in FIG. 8 may be compensated by a reflection cancellation block, such as reflection cancellation block 680 in FIG. 6, where the DLL/phase interpolation unit 602 provides phases that correspond to the time periods (t1−tf), (t2−tf), (t3−tf), (t4−tf), etc., the driver providing weighted values of the present and previous bits to compensate for the perturbations.

Figure 9:
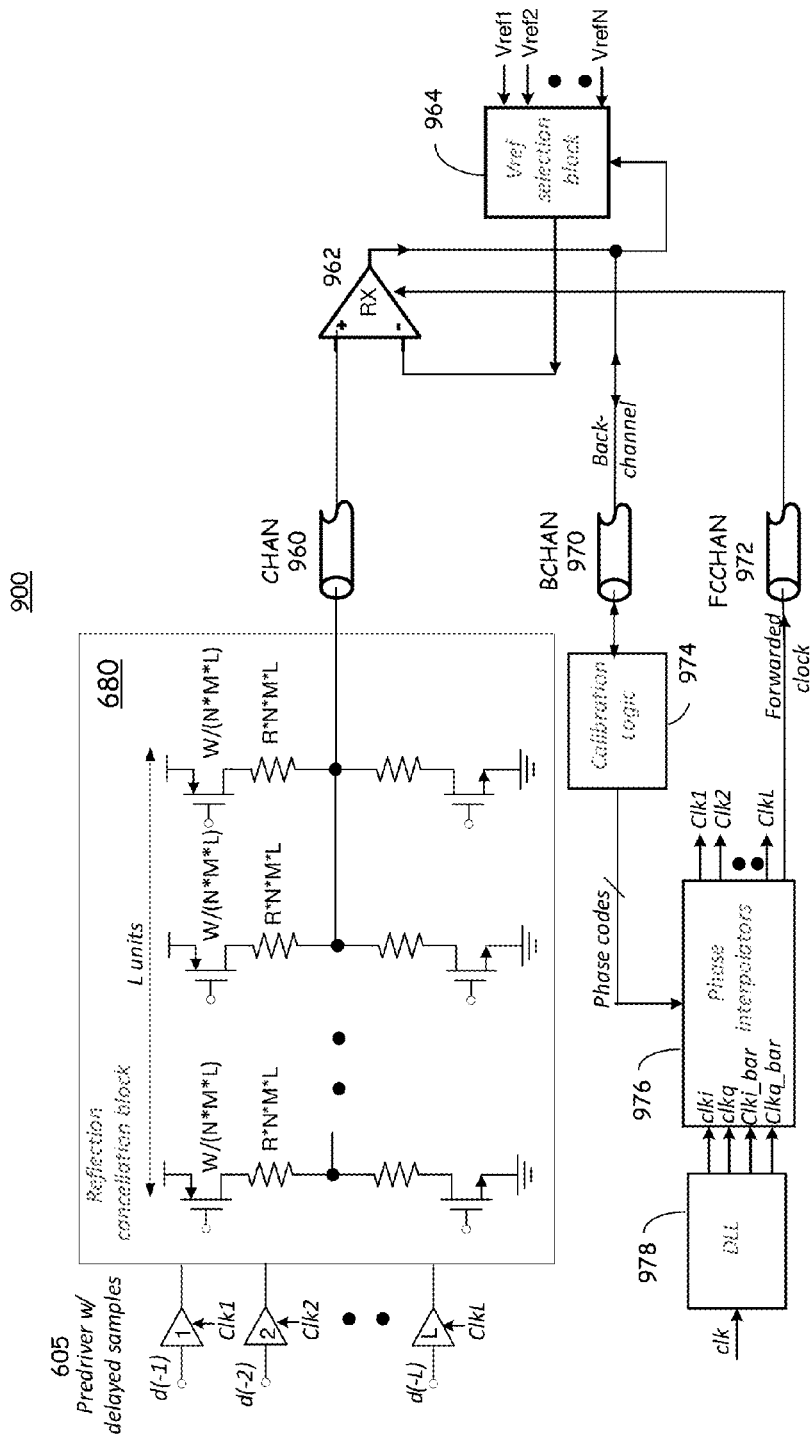
FIG. 9 illustrates an embodiment of a portion of a multi-dimensional driver apparatus or system providing for reflection cancellation.

In some embodiments, a method, apparatus, or system provides for detecting the amount and timing of reflection components at a receiver in order to make necessary corrections, as shown in FIG. 9, which is described below. In some embodiments, correction for reflective components provides for reverse communication of data regarding reflective elements and correction. In some embodiments, a backchannel is used to communicate information regarding the optimum settings of the coefficients. In some embodiments, the information may be stored, such as storing such information in DRAM memory. In some embodiments, the DLL may provide the I (in-phase), Q (quadrature-phase), Ibar, and Qbar phases for a four quadrant phase adjustment. In some embodiments, the phase interpolators may adjust the phases for each pre-driver coefficient based on the phase code data from the calibration logic block.

In some embodiments, a positive step and a negative step are used to assess the data characteristics with respect to the reflective behavior. In some embodiments, during a calibration phase, positive pulses are sent at very low frequencies, with a backchannel being used to transmit data to select the correct reference voltages for different parts of the bit period. In some embodiments, for every clock phase that is adjusted, the reference voltages are updated to detect the correct voltage at the receiver. In this way, the whole eye may be scanned (in a two-dimensional scan), and the determined phase codes and reference voltage data are stored in the calibration logic.

While the reflection control is illustrated in terms of the I/O structure provided in the Figures presented here, embodiments are not limited to such I/O structure. In some embodiments, reflection cancellation using drivers/receivers with timing that may not be an integral multiple of a bit or clock period is further utilized in other signal communications. In some embodiments, the reflection cancellation also may be utilized to cancel crosstalk from adjacent channels or switching noise on the supply when the supply noise can be determined by the specific sequence of bits. In some embodiments, the cancellation may be applied to DRAM I/O's as well, where the timing and equalization information may be stored in registers that are specific to controlling the performance of the DRAM PHY.

FIG. 9 illustrates an embodiment of a portion of a multidimensional driver apparatus or system providing for reflection cancellation. In this illustration, a driver 900 includes reflection cancellation block 680, such as illustrated in FIG. 6. As illustrated, each reflection cancellation block 680 received data with delayed samples from the predriver 605.

In some embodiments, the driver 900 is coupled with a first end of a channel (CHAN) 960, where a receiver (RX) 962 is connected to a second end of CHAN. In some embodiments, an output of RX is coupled with a reference voltage selection block 964, which receives a plurality of voltages (Vref1 through VrefN) and provides a selected voltage as a second input of RX 962. RX 962 and Vref selection block are further coupled with a backchannel (BCHAN) 970. Data received from the back channel is received by a calibration logic block 974, which provides phase codes from a calibration phase. In some embodiments, an apparatus includes a DLL 978 and phase interpolators 976 (such as elements of DLL/phase interpolator unit 602 illustrated in FIG. 6). In some embodiments, the DLL 978 provides quadrature clock elements clki, clkq, clki_bar, and clkq_bar to phase interpolators 976, which also received the phase codes from the calibration logic and which generates the delayed sample clock signals Clk1, Clk2, and continuing through ClkL and generates a forwarded clock signal, where the forward clock signal is transferred via a forward clock channel (FCCHAN) 972 for clocking of RX 962.

Figure 10:
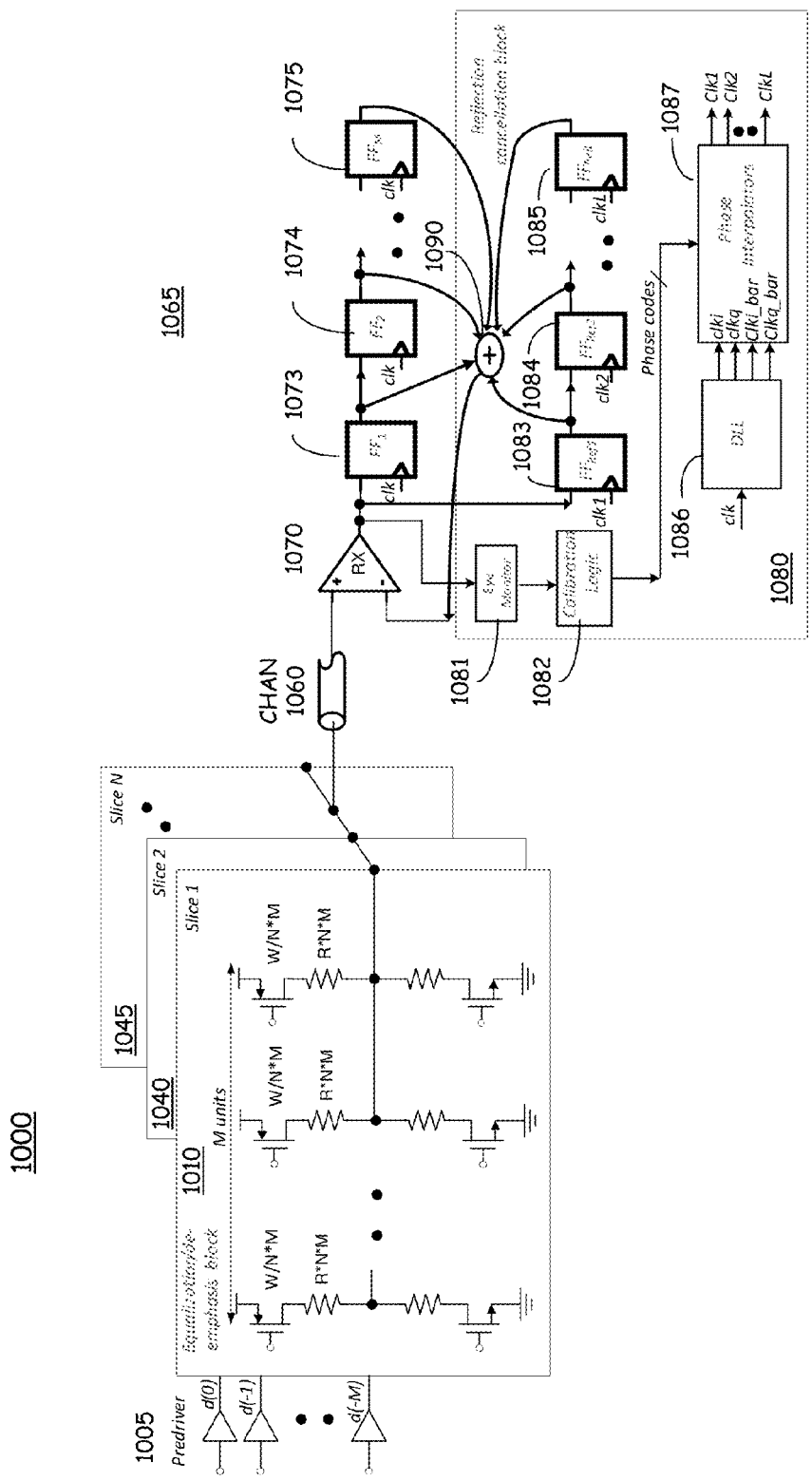
FIG. 10 illustrates an embodiment of a portion of a system providing for reflection cancellation.

FIG. 10 illustrates an embodiment of a portion of a system providing for reflection cancellation. In this illustration, a driver 1000 includes M equalization/de-emphasis blocks in each circuit slice, the slices being slice 1 1010, slice 2 1040, and continuing through slice N 1045, such as illustrated in FIG. 10. As illustrated, the predriver 1005 provides M samples, d(0), d(-1), and continuing through D(-M). The driver apparatus 1000 may be coupled at a transmitting side of a communication channel (CHAN) 1060, where a first input of a receiver (RX) 1070 of a receiving apparatus 1065 may be coupled with a receiving side of CHAN 1060.

In some embodiments, a reflection cancellation block may alternatively be placed in the receiver apparatus 1065, as illustrated in FIG. 10. In some embodiments, an output of RX 1070 is coupled with a first plurality of flip-flops or latches connected in a series, shown as a first flip-flop ($FF_1$) 1073, a second flip-flop ($FF_2$) 1074, and continuing through an M-th flip-flop ($FF_M$) 1075. In some embodiments, each of the flip-flops 1073-1075 receives a clock signal clk.

In some embodiments, the receiving apparatus 1065 further includes a reflection cancellation block 1080, the reflection cancellation block including a second plurality of flip-flops or latches connected in a series coupled with the output of RX 1070, shown as a first reflection flip-flop ($FF_{Refl}$) 1083, a second flip-flop ($FF_{Ref2}$) 1084, and continuing through an L-th reflection flip-flop ($FF_{RefL}$) 1085. In some embodiments, each of the reflection flip-flops 1083-1085 receives a separate delayed clock signal, illustrated as $FF_{Refl}$ 1083 receiving clk1, $FF_{Ref2}$ 1084 receiving clk2, and continuing $FF_{RefL}$ 1085 receiving clkL. In some embodiments, a sampled output of each of the first plurality of flip-flops and each of the second plurality of flip-flops is summed by a summing block or other element 1090, the resulting sum being provided as a second input of RX 1070.

In some embodiments, the reflection cancellation block 1080 further includes an eye monitor 1081 receiving an output of the receiver 1070 to monitor the eye output. The eye monitor 1081 is coupled with calibration logic block 1082, which provides phase codes. In some embodiments, an apparatus includes a DLL 1086 and phase interpolators 1087 (such as elements of DLL/phase interpolator unit 602 illustrated in FIG. 6). In some embodiments, the DLL 1086 provides quadrature clock elements clki, clkq, clki_bar, and clkq_bar to phase interpolators 1087, which also received the phase codes from the calibration logic block 1082 and which generates the delayed sample clock signals clk1, clk2, and continuing through clkL.

In some embodiments, the eye monitor circuit monitors 1081 the eye width and height for optimization of weighting parameters (which is not shown in the figure) as well as the phase codes. In some embodiments, the summing block 1090 sums each of the samples from the first and second plurality of flip-flops in weighted manner, such as according to weighting factors $\alpha 1$, $\alpha 2$ etc., where this is true for all components that are summed. In some embodiments, the reflection cancellation technique illustrated in FIG. 10 provides an extension in operation, where the reflection cancellation block provides for additional functionality in canceling reflected components such that the RX 1070 sees an optimalized eye opening. In contrast to the reflection cancellation block in the TX, as illustrated in FIGS. 6 and 9, the RX reflection cancellation block 1080 has samples that are derived from an RX input buffer, with the samples being delayed in a fractional time period sense. For example, Clk1 may be set to 2×tf (two times the time of flight) time delay (wherein RX buffer delay is neglected for simplicity) after the bit transition point. In this example, the first sample is reflected and comes back to the receiver, when the output of $FF_{refl}$ is intended to provide the appropriate weighting component to cancel this component at the receiver input. This technique extends to each of the other samples in the reflection cancellation block.

Figure 11:
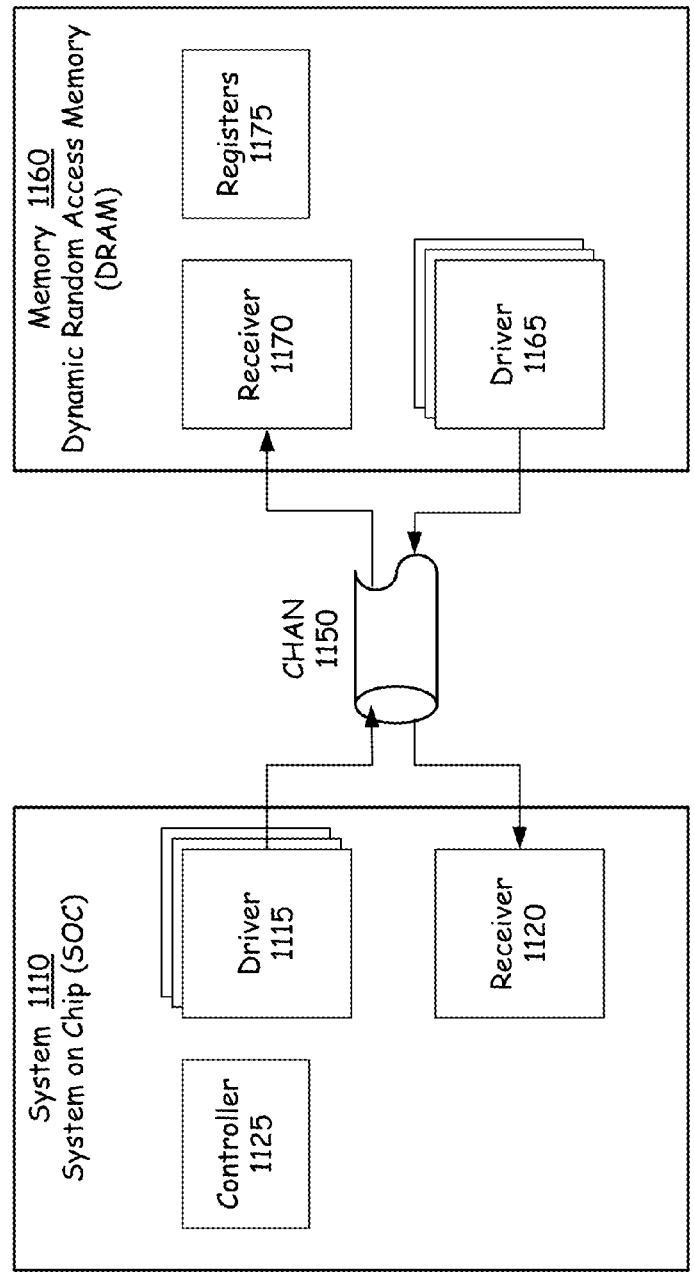
FIG. 11 illustrates an embodiment of a multi-dimensional driver apparatus for an interface between devices.

FIG. 11 illustrates an embodiment of a multi-dimensional driver apparatus for an interface between devices. In some embodiments, a first device, such as a system 1110, is coupled with a second device, such a memory 1160, via a channel 1150 (which may represent one or more channels between the first device and the second device). In some embodiments, the system is a system on chip (SOC) and the memory is a dynamic random access memory (DRAM). In some embodiments, one or both of the system 1110 and memory 1160 includes a configurable multi-dimensional driver apparatus. In this illustration, the system 1110 includes a configurable multi-dimensional driver apparatus 1115, such as an apparatus illustrated in FIG. 8 including a plurality of circuits, wherein each circuit includes one or more circuit units and each circuit sub-unit includes a plurality of circuit sub-units. In some embodiments, the driver apparatus 1115 is coupled via the channel 1150 with a receiver apparatus 1170, and the memory 1160 includes a configurable multi-dimensional driver apparatus 1165, which is coupled via the channel 1150 with a receiver apparatus 1120.

In some embodiments, the parameters of the driver and receiver apparatuses, such as the termination resistances, may be either symmetrical or asymmetrical. For example, in a read operation from the memory 1160 to the system 1110, with data being driven by driver apparatus 1165 to receiver apparatus 1120, there may be a valid termination on both sides from the memory 1160 and the system 1110, while in a write operation from the system 1110 to the memory 1160, with data being driven by driver apparatus 1115 to receiver apparatus 1170, there may a termination resistance on the system 1110 side and no termination for the receiver on the memory 1160 side.

In some embodiments, parameter information for the link between the system 1110 and memory 1160, such as data regarding termination, equalization, and reflection capability, may be stored in on chip registers 1175 of the memory 1160, if the memory 1160 is the secondary device. For example, the system may include has a controller 1125 while the memory does not include a controller. In some embodiments, the parameter information is stored in the on chip registers 1175 for the memory 1160 to access.

Figure 12:
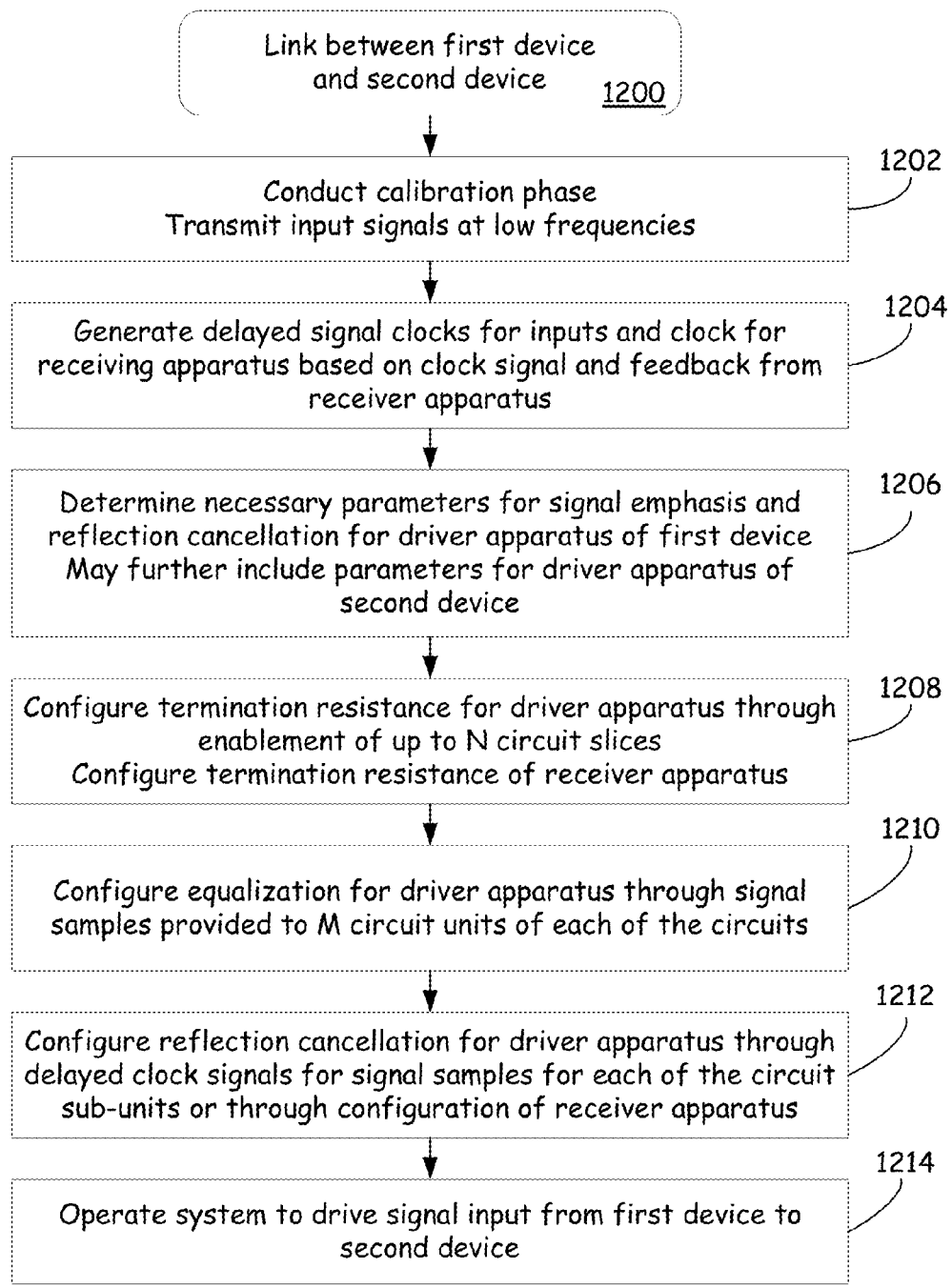
FIG. 12 is a flowchart to illustrate an embodiment of a process for driving data from a first device to a second device utilizing a multi-dimensional driver apparatus.

FIG. 12 is a flowchart to illustrate an embodiment of a process for driving data from a first device to a second device utilizing a multi-dimensional driver apparatus. In some embodiments, in a communication interface between a first device and a second device 1200, the first device includes a configurable multi-dimensional driver apparatus and the second device includes a receiver apparatus. In some embodiments, the receiver apparatus may also be configurable, including a configurable termination resistance. In some embodiments, a calibration phase may be conducted to determine circuit parameters, which may include transmitting signals at low frequencies 1202. In some embodiments, in calibration and operation delayed signal clocks for signal sample inputs and a clock for receiving apparatus are generated based on a clock signal and feedback from the receiver apparatus 1204, as provided in, for example, FIG. 9 described above. In some embodiments, the necessary parameters for the driver apparatus of the first device and the receiving apparatus of the second device are determined 1206. In some embodiments, parameters for a reverse connection of a driver apparatus of the second device and a receiving apparatus of the first device are also determined. In some embodiments, parameters for an interface may be stored in one or more registers of a device, such as a memory device, that does not include a controller.

In some embodiments, a termination resistance of the driver apparatus is configured by enablement of up to N circuit slices 1208. In some embodiments, a termination resistance of the receiver apparatus may also be configured.

In some embodiments, signal equalization for the driver apparatus is configured by the provision of certain signal samples to the M (where M is one or more) circuit units of each of the circuit slices 1210. In some embodiments, signal reflection cancellation is configured for the communication interface 1212. In some embodiments, configuration of the signal reflection cancellation includes configuring the driver apparatus by the delaying of signal samples to the L circuit sub-units of each of the circuit units, such as illustrated in FIG. 9. In some embodiments, configuration of the signal reflection cancellation includes configuring the receiver apparatus by adjusting the clocking of flip-flop devices that are coupled with a receiver, such as illustrated in FIG. 10, In some embodiments, the system is operated utilizing the driver apparatus as configured to drive a signal from the first device to the second device 1214.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. There may be intermediate structure between illustrated components. The components described or illustrated herein may have additional inputs or outputs that are not illustrated or described. The illustrated elements or components may also be arranged in different arrangements or orders, including the reordering of any fields or the modification of field sizes.

The present invention may include various processes. The processes of the present invention may be performed by hardware components or may be embodied in computer-readable instructions, which may be used to cause a general purpose or special purpose processor or logic circuits programmed with the instructions to perform the processes. Alternatively, the processes may be performed by a combination of hardware and software.

Portions of the present invention may be provided as a computer program product, which may include a computer-readable storage medium having stored thereon computer program instructions, which may be used to program a computer (or other electronic devices) to perform a process according to the present invention. The computer-readable storage medium may include, but is not limited to, floppy diskettes, optical disks, CD-ROMs (compact disk read-only memory), and magneto-optical disks, ROMs (read-only memory), RAMs (random access memory), EPROMs (erasable programmable read-only memory), EEPROMs (electrically-erasable programmable read-only memory), magnet or optical cards, flash memory, or other type of media/computer-readable medium suitable for storing electronic instructions. Moreover, the present invention may also be downloaded as a computer program product, wherein the program may be transferred from a remote computer to a requesting computer.

Many of the methods are described in their most basic form, but processes may be added to or deleted from any of the methods and information may be added or subtracted from any of the described messages without departing from the basic scope of the present invention. It will be apparent to those skilled in the art that many further modifications and adaptations may be made. The particular embodiments are not provided to limit the invention but to illustrate it.

If it is said that an element "A" is coupled to or with element "B," element A may be directly coupled to element B or be indirectly coupled through, for example, element C. When the specification states that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification refers to "a" or "an" element, this does not mean there is only one of the described elements.

An embodiment is an implementation or example of the invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects.

What is claimed is:

1. A driver circuit apparatus comprising:
   a predriver to provide data signals;
   a plurality of circuits to receive and drive the data signals from the predriver, wherein:
      the plurality of circuits are configurable for termination resistance of the driver circuit apparatus;
      each of the plurality of circuits is comprised of a plurality of circuit units, the plurality of circuit units being configurable for equalization control of the driver apparatus, and
      each of the plurality of circuit units is comprised of a plurality of circuit sub-units, the plurality of circuit sub-units being configurable for signal reflection control for the driver apparatus; and
   an interface with a communication channel, the plurality of circuits being coupled with the communication channel.

2. The driver circuit apparatus of claim 1, wherein each of the plurality of circuit sub-units includes a first resistor and a second resistor, wherein:
   a first end of the first resistor is coupled with the communication channel and a second end of the first resistor is coupled with a first terminal of a first transistor;
   a first end of the second resistor is coupled with the communication channel and a second end of the second resistor is coupled with a first terminal of a second transistor; and
   a second terminal of the first transistor is coupled with a supply voltage, and a second terminal of the second transistor is coupled with ground.

3. The driver circuit apparatus of claim 1, wherein a signal sample of a series of signal samples of an input signal is provided for each circuit unit, and wherein one of a series of delayed versions of a signal sample is provided for each of the circuit units.

4. The driver circuit apparatus of claim 3, wherein the plurality of circuits are configurable for equalization control by providing signal samples among the plurality of circuit units to generate needed signal weighting for the driver circuit apparatus.

5. The driver circuit apparatus of claim 3, wherein the plurality of circuit sub-units for each circuit unit are configurable for signal reflection control by providing delays for the signal samples to provide control of signal reflection between the driver circuit apparatus and a receiver circuit apparatus coupled with the communication channel.

6. The driver circuit apparatus of claim 5, wherein delay periods for the delays of the signal samples are not integral multiples of a clock period.

7. The driver circuit apparatus of claim 1, wherein the driver apparatus includes N circuits, wherein each of the circuits includes M circuit units, and wherein each of the circuit units includes L circuit sub-units, N, M, and L being integers of two or greater.

8. The driver circuit apparatus of claim 7, wherein a circuit sub-unit includes a first resistor of resistance R ohms, and wherein a first resistance of the driver circuit apparatus has a value of R×N×M×L ohms.

9. The driver circuit apparatus of claim 7, wherein a circuit sub-unit includes a first transistor with a gate width of W, and wherein an equivalent gate width value of the driver circuit apparatus is W/(N×M×L).

10. A communication system comprising:
    a communication channel; and
    a first device coupled with the communication channel, the first device including a driver apparatus to drive data signals on the communication channel, the driver apparatus including a plurality of circuits to receive and drive the data signals, wherein:
       the plurality of circuits are configurable for termination resistance of the driver circuit apparatus, and
       each of the plurality of circuits is comprised of a plurality of circuit units, the plurality of circuit units being configurable for equalization control of the driver apparatus;
    wherein the first device includes configurable circuit elements to provide signal reflection control for the system, each of the plurality of circuit units being comprised of a plurality of circuit sub-units, the circuit sub-units being configurable for signal reflection control for the driver apparatus.

11. The system of claim 10, wherein a second device is coupled with the communication channel, the second device including a receiver to receive data signals from the communication channel as an input.

12. The system of claim 11, wherein the second device further comprises a reference voltage selection block providing one of a plurality of reference voltages as a second input to the receiver.

13. The system of claim 11, wherein the first device further includes a calibration logic block to receive an output of the receiver and produce phase codes.

14. A system for signal communication comprising:
    a first device, the first device comprising a multi-dimensional driver apparatus having a plurality of circuits, the driver apparatus including:
       configurable termination resistance, wherein the configuration of the termination resistance is provided by enablement of one or more of the plurality of circuits,
       configurable signal emphasis, wherein the configuration of the signal emphasis is provided by signal samples provided to each of a plurality of circuit units for each of the circuits, and configurable reflection cancellation, wherein the configuration of the reflection cancellation is provided by delayed clocks for the clocking of the signal samples provided to each of a plurality of circuit sub-units for each of the plurality of circuit units.

15. The system of claim 14, wherein a second device is coupled with the first device via a communication channel, the second device including a receiver apparatus to receive data signals from the communication channel, and wherein the first device further includes a receiver apparatus and the second device further includes a driver apparatus.

16. The system of claim 15, wherein the termination resistance of the driver apparatus of the first device and a termination resistance of the driver apparatus of the second device are configurable to be different from each other.

17. The system of claim 14, wherein a termination resistance of the receiver apparatus of the first device and a termination resistance of the receiver apparatus of the second device are configurable to be different from each other.

18. The system of claim 17, where the receiver apparatus of the first device or the receiver apparatus of the second device may be configured to have no termination resistance.

19. The system of claim 14, wherein the first device is a system on chip (SOC) and the second device is a dynamic random access memory (DRAM).

20. The system of claim 14, wherein delay periods for the delayed clocks are not integral multiples of a clock period.

21. A method for configuring a communication interface comprising:
   determining parameters for an interface between a first device and a second device, the first device including a configurable driver apparatus;
   configuring a termination resistance of the driver apparatus of the first device by enabling one or more of a plurality of circuits;
   configuring signal equalization of the driver apparatus by providing certain signal samples to a plurality of circuit units of each of the plurality of circuits; and
   configuring signal reflection cancellation for the communication interface using a plurality of circuit sub-units of each of the plurality of circuits units of each of the plurality of circuits.

22. The method claim 21, further comprising conducting a calibration phase for the communication interface to determine the parameters for the interface.

23. The method of claim 21, wherein the calibration phase includes clocking the first device and second device with a reduced clock speed.

24. The method of claim 21, wherein configuring signal reflection cancellation includes the driver apparatus providing certain timing delays for inputs of the signal samples to the plurality of circuit sub-units of each of the plurality of circuits units of each of the plurality of circuits.

25. A communication system comprising:
   a communication channel;
   a first device coupled with the communication channel, the first device including a driver apparatus to drive data signals on the communication channel, the driver apparatus including a plurality of circuits to receive and drive the data signals, wherein:
      the plurality of circuits are configurable for termination resistance of the driver circuit apparatus, and
      each of the plurality of circuits is comprised of a plurality of circuit units, the plurality of circuit units being configurable for equalization control of the driver apparatus; and
   a second device coupled with the communication channel, the second device including a receiver to receive data signals from the communication channel as an input;
   wherein either the first device or the second device includes a plurality of configurable circuit elements to provide signal reflection control for the system;
   wherein the first device further includes:
      a calibration logic block to receive an output of the receiver and produce phase codes; and
      a phase interpolator circuit block coupled with the calibration logic block to receive the phase codes from the calibration logic block and clock signals from a delay locked loop to generate clock signals for delayed signal samples provided to the circuit sub-units.

26. A communication system comprising:
   a communication channel;
   a first device coupled with the communication channel, the first device including a driver apparatus to drive data signals on the communication channel, the driver apparatus including a plurality of circuits to receive and drive the data signals, wherein:
      the plurality of circuits are configurable for termination resistance of the driver circuit apparatus, and
      each of the plurality of circuits is comprised of a plurality of circuit units, the plurality of circuit units being configurable for equalization control of the driver apparatus; and
   a second device coupled with the communication channel, the second device including a receiver to receive data signals from the communication channel as an input;
   wherein the second device includes a plurality of configurable circuit elements to provide signal reflection control for the system, the second device including a summing element, the summing element receiving outputs of a first plurality of flip-flops in a series coupled with an output of the receiver and outputs of a second plurality of flip-flops in a series coupled with the output of the receiver, each of the first plurality of flip-flops being clocked by a common first clock signal, each of the second plurality of flips-flops being clocked by a respective delayed clock signal.

27. The system of claim 26, wherein a sum generated by the summing element is provided as a second input to the receiver.

28. The system of claim 26, wherein the second device further includes an eye monitor to monitor an eye pattern of data signals in the receiver.

29. A method for configuring a communication interface comprising:
   determining parameters for an interface between a first device and a second device, the first device including a configurable driver apparatus and the second device including a receiving apparatus;
   configuring a termination resistance of the driver apparatus of the first device by enabling one or more of a plurality of circuits;
   configuring signal equalization of the driver apparatus by providing certain signal samples to a plurality of circuit units of each of the plurality of circuits;
   configuring signal reflection cancellation for the communication interface; and
   providing an output of a receiver of the receiver apparatus to a first plurality of flip-flops and to a second plurality of flip-flops, and summing outputs of the first plurality of flip-flops and the second plurality of flip-flops, and wherein configuring signal reflection cancellation includes the receiver apparatus providing timing delays for the second plurality of flip-flops.

\* \* \* \* \*